United States Patent [19]
Millett et al.

[11] Patent Number: 5,429,151
[45] Date of Patent: Jul. 4, 1995

[54] THROUGH-HULL VALVE AND MOUNTING UNIT

[75] Inventors: James A. Millett, Ramona; Robert R. Foresman, San Juan Capistrano, both of Calif.

[73] Assignee: R.C. Products Corp., Rancho Santa Margarita, Calif.

[21] Appl. No.: 966,370

[22] Filed: Oct. 22, 1992

[51] Int. Cl.$^6$ .................. F16K 5/06; F16K 51/00; F16L 5/00
[52] U.S. Cl. .................. 137/315; 137/360; 251/143; 251/152; 251/315.13; 285/161; 285/219
[58] Field of Search ............. 137/315, 360; 251/143, 251/148, 151, 152, 315 R, 315 HU, 315 RC; 285/219, 328, 335, 334.1, 386, 391, 392, 161, 192, 194

[56] References Cited
U.S. PATENT DOCUMENTS

| | | | |
|---|---|---|---|
| 1,153,282 | 9/1915 | Zahon | 285/161 |
| 2,992,018 | 7/1961 | Rosan | 285/161 |
| 3,136,570 | 6/1964 | Lee | 137/360 |
| 3,137,310 | 6/1964 | Young | 137/329.01 |
| 3,656,711 | 4/1972 | Toelke | 251/151 |
| 3,667,725 | 6/1972 | Scaramucci | 251/151 |
| 3,671,010 | 6/1972 | Scaramucci | 251/151 |
| 3,779,509 | 12/1973 | Vandenbroek | 251/148 |
| 3,783,890 | 1/1974 | Wurzburger | 137/315 |
| 3,971,401 | 7/1976 | Persson | 137/360 |
| 4,103,866 | 8/1977 | Robinson | 251/152 |
| 4,441,524 | 4/1984 | Mese | 251/315 |
| 4,586,733 | 5/1986 | Anderson, Jr. | 285/386 |
| 4,650,157 | 3/1987 | Sillaman | 251/315 |
| 4,708,158 | 11/1987 | Akamatsu | 251/152 |
| 4,887,644 | 12/1989 | Jeromson et al. | 251/148 |
| 4,920,626 | 5/1990 | Nimberger | 285/219 |
| 5,037,140 | 8/1991 | Anderson | 285/161 |

*Primary Examiner*—George L. Walton
*Attorney, Agent, or Firm*—G. Donald Weber, Jr.

[57] ABSTRACT

An integrated plumbing system comprising a plurality of interchangeable and interengagable parts which is especially useful in conjunction with boats or other marine vessels. The plumbing system includes a through-hull unit, a mounting unit, a ball valve and a plurality of components useful therewith. The components, including the valve, are made of a strong, non-corrosive, non-metallic material, in particular, a plastic-type material known as MARELON. The valve and associated components and fittings provide various configurations of units which are adapted to numerous plumbing requirements. The mounting unit permits close-coupling of the system to provide enhanced lever ratios in the event accidental side loads are applied to the system.

12 Claims, 2 Drawing Sheets

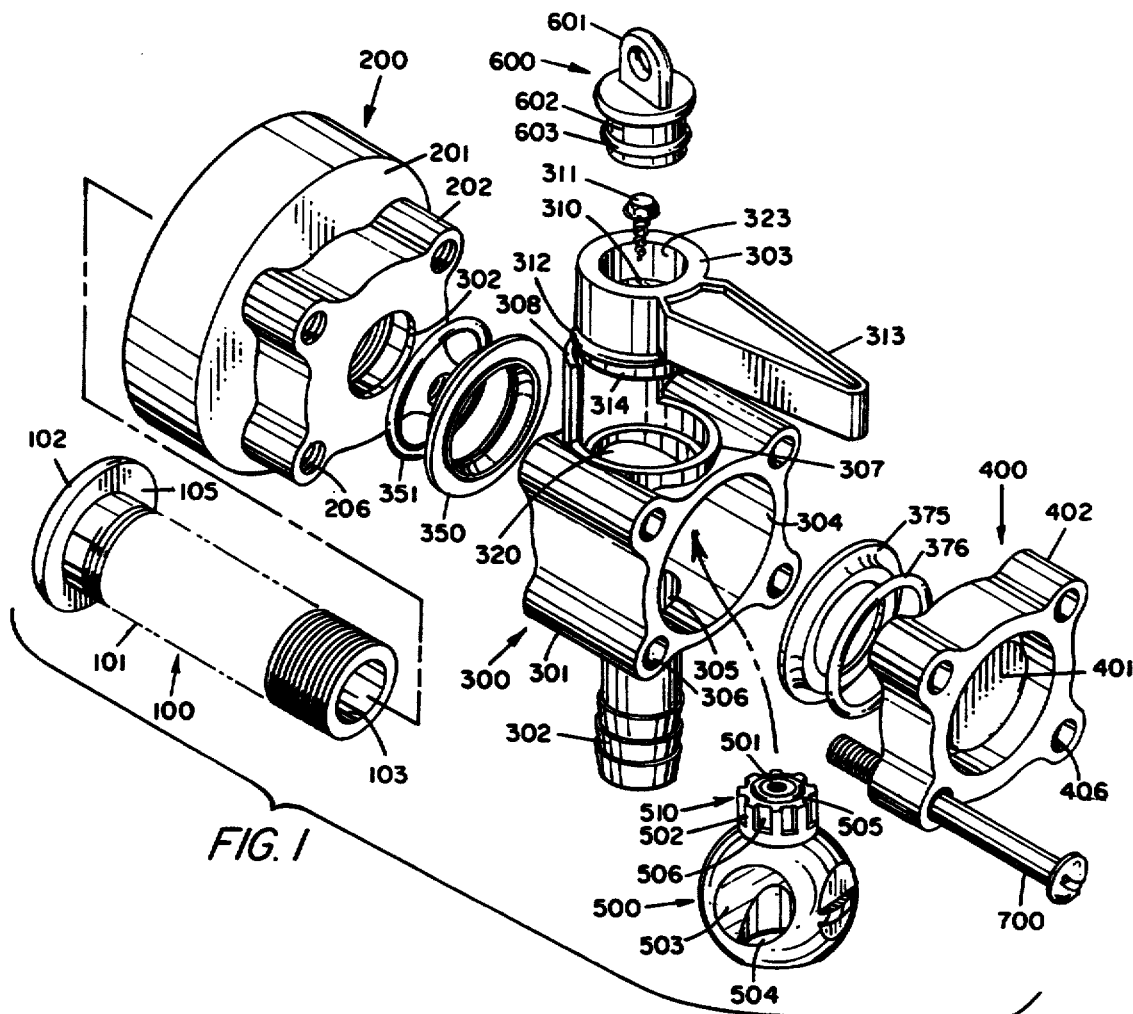
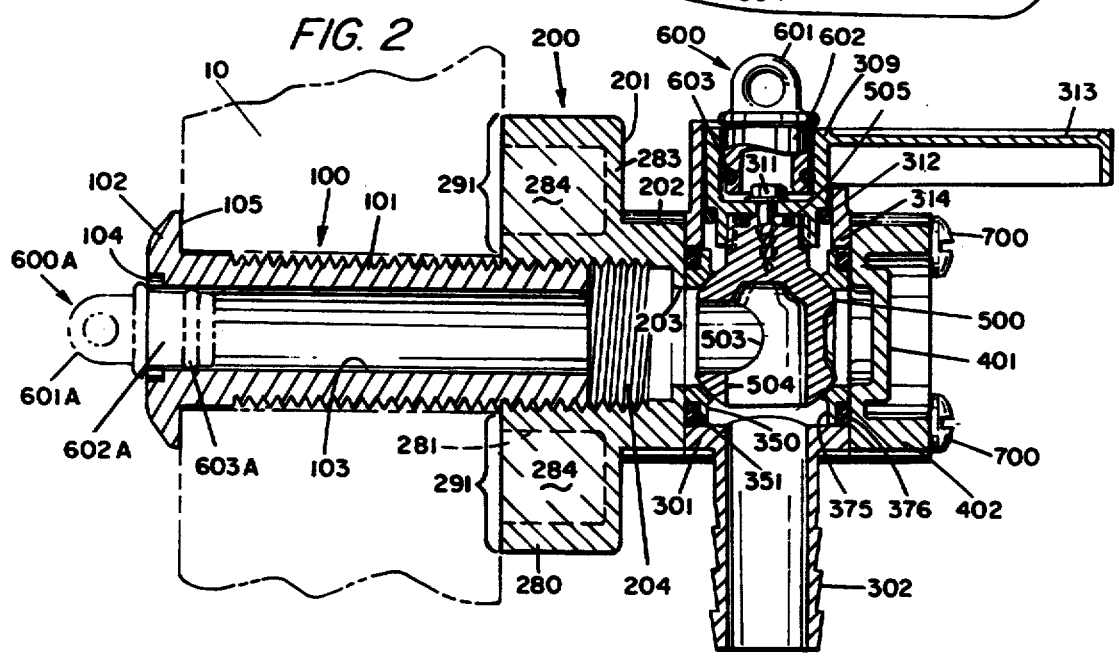

THROUGH-HULL VALVE AND MOUNTING UNIT

BACKGROUND

1. Field of the Invention

This invention is directed to plumbing systems for use in marine vessels, in general, and to plumbing systems which incorporate through-hull units with mounting nuts, together with ball valves, tail pipes, elbows and similar components, in particular.

2. Prior Art

There are many types of plumbing systems and components used in marine vessels. One such system is a through-hull connector and devices which are used in connection with marine vessels. For the most part, the prior art through-hull connectors are made of bronze or other exotic materials which are utilized in order to reduce corrosion or the like. Obviously, many types of materials are not acceptable for this reason alone.

In addition, the through-hull connection is frequently connected to valves and/or other plumbing system devices inside the vessel. These valves and plumbing devices are, typically, fabricated of the same material as the through-hull connector. These devices tend, therefore, to be quite heavy. In order to have adequate strength, the devices, including the plumbing components, tend to become awkward, bulky and expensive. In addition, these components are, generally, attached to the inner end of the through-hull unit. In the past, these components have created an unacceptably large leverage ratio on the through-hull and/or the couplings. This leads to an unsafe condition due to potential rupture of the system in the event of accidental side loads from people falling, shifting of stores at sea, or the like.

Prior attempts to replace these components with lightweight materials such as plastic or the like have been unsuccessful because of strength problems. That is, even with high-strength plastics, the leverage of the inner portion on the through-hull (or the connection thereto) is too high to allow the through-hull to support the required loads.

Moreover, in the past, the known plumbing systems, including existing ball valves and the like, have been relatively large and cumbersome. This has required the devices and components to be mounted in a fashion which required a substantial amount of space in the interior of a vessel. Inasmuch as most vessels are cramped for space, this became an undesirable feature of the devices.

Consequently, it is highly desirable to have an improved plumbing system, including the mounting devices and the various components which can be associated therewith, to effect improved design and operational aspects in tight spaces.

SUMMARY OF THE INSTANT INVENTION

An integrated plumbing system for marine vessels is provided. The system includes a through-hull connector, inlet connectors, outlet connectors, mounting nuts and a ball valve of improved design. These components are configured for straight-through operation or angled operation, with connector barbs and the like. The components of the integrated plumbing system are, for the most part, all constructed of a strong, plastic material, for example, plastic-type material known by the registered trademark MARELON, which has significant advantageous characteristics and properties.

The plumbing system includes components having a short coupled, compact design. The mounting nut provides an improved leverage ratio which imparts overall strength to the system. In addition, the valve bodies utilize dynamic seals to optimize performance.

BRIEF DESCRIPTION OF THE DRAWINGS

FIG. 1 is an exploded view of one embodiment of a plumbing system including a through-hull connector, a mounting nut, a ball valve and connection components in accordance with the instant invention.

FIG. 2 is a cross-sectional view of the embodiment shown in FIG. 1 after assembly including a plug shown in phantom in the closure mode.

DESCRIPTION OF A PREFERRED EMBODIMENT

Figure 8:
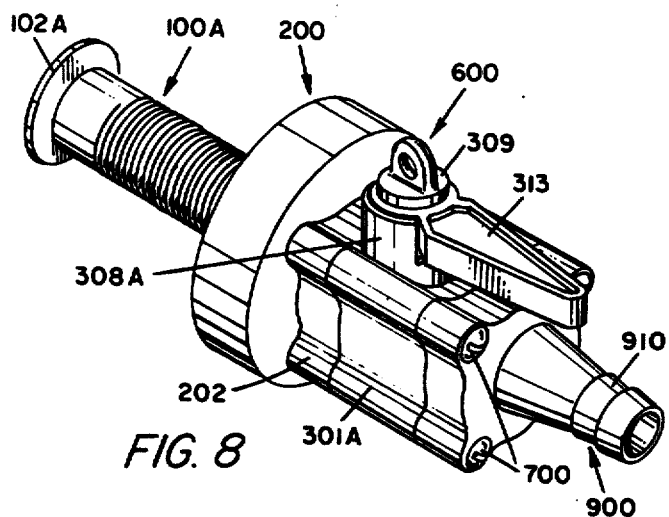
FIG. 8 is an isometric view of a modified version of the apparatus shown in FIG. 1.

Referring now to FIG. 1, there is shown an exploded view of one embodiment of the instant invention. In this embodiment, the apparatus includes a through-hull connector tube 100, mounting nut 200 and valve assembly 300 for use in accordance with the integrated plumbing system of the instant invention. In this particular embodiment, each of the components is fabricated of a plastic material, such as, but not limited to, material sold under the trademark MARELON. In some cases, the plastic material may be high-strength glass reinforced. The preferred material provides substantial strength, light weight and complete freedom from corrosion and electrolysis.

In the embodiment shown in FIG. 1, the basic components include a through-hull connector 100, a mounting nut 200, a ball valve 300 (which includes a ball 500) and an outlet cap 400. In this particular application, a plug 600 is provided in handle 313 of ball valve 300.

In greater detail, the through-hull connector tube 100 is, generally, a hollow, cylindrical device, with a cap 102 formed at one end thereof. The cap 102 provides a relatively large shoulder 105 which abuts against the outer surface of the hull of the vessel (see FIG. 2) in which the apparatus is placed and mounted.

The connector 100 includes an axial aperture 103 therethrough. The outer surface 101 of the connector tube 100 is threaded for at least a portion thereof. In order to accommodate a large number of vessels with different hull thickness, the threads 101 may extend along the entire length of the connector tube 100. Connector tube 100 provides a function which is similar to conventional through-hull devices.

The mounting nut 200 includes a relatively large diameter base 201 which is in the form of a short cylinder or thick washer or the like. Typically, but not limitatively, the diameter of the mounting nut is on the order of twice the diameter of the connector tube 100.

The inner surface of the base 201 (not shown in FIG. 1) abuts against the inside surface of the hull of the vessel in which the apparatus is mounted.

Integrally formed with the base 201 is a body nut 202. The body nut 202 includes a central aperture 203, which is threaded on the internal surface thereof and is adapted to threadedly engage threads 101 on the connector 100. By tightening body nut 202 onto through-hull unit 100, the shoulder 105 of cap 102 is securely clamped to the vessel hull, whereby a watertight mounting is provided.

At the corners of the substantially rectilinear shaped body nut 202 are holes 206. The holes 206 are threaded on the internal surface thereof to receive screws 700 (described hereinafter) which are used to attach the system components to the mounting nut.

A ball valve 300 is arranged to be connected in the system. The valve 300 includes an outer body 301 which is, generally, cubical in configuration. That is, the body 301 includes length, width and height. The central portion of the body 301 is excavated to provide cavity 304. The cavity 304 receives the ball 500, as described hereinafter. In addition, one side of the body 301 (the top side in FIG. 1) also includes an opening 320 through which the ball 500 is attached to handle 313. The opening 320 is defined by a circumferential lip 307 which extends slightly above the top of body 301. The lip 307 provides a track for rotationally receiving a pivot portion of handle 313. A shoulder 321 is formed between opening 320 and lip 307. The shoulder 321 is used to support the pivot portion of handle 313. An enlarged or extended portion 308 of lip 307 functions as a limit-stop for rotation of handle 313 and, thus, operation of ball valve 500.

In particular, the stop 308 is adapted to determine the length of swing or pivotal movement of the handle 313. The handle 313 is connected to (or formed with) a cylindrical section 309 which includes base 310 of blind bore 323. A screw 311 is passed through base 310 to engage the ball 500 as described hereinafter. In one embodiment, the inner diameter of bore 323 is substantially the same as the inner diameter of aperture 103 in connector 100 to receive plug 600 as described infra.

The inner end 314 of the cylinder 309 preferably includes splines or keys (see FIG. 2) on the inner surface thereof. These splines engage complementary splines or keys on ball 500 as described infra. An O-ring 312 is provided in a suitable groove or shoulder at cylinder 309 and inner end 314 thereof to provide a seal for the valve.

At the bottom of the body 301 (in the embodiment shown in FIG. 1) there is an opening 305 which communicates with the cavity 304. The opening 305 also communicates with the channel or bore which passes axially through the connector end 302. In this embodiment, connector 302 takes the form of a hose barb which extends from the bottom of body 301. In this embodiment, connector end 302 is integrally formed with body 301. Thus, in certain circumstances, fluid or liquid passing through ball valve 300 will exit (or enter) through connector end 302 and be diverted by the ball valve through connector tube 100 or vice versa.

A ball 500 is mounted within the cavity 304 in body 301. The ball 500 includes a first aperture 503 which passes therethrough in one axial direction and is adapted to communicate with the channel 103 in connector tube 100.

In the embodiment shown in FIG. 1, ball 500 also includes an aperture or opening 504 in the bottom thereof which communicates with the opening 305 in connector 302.

The top of the ball 500 includes a generally cylindrical projection 510 extending therefrom. The cylindrical projection 510 includes a plurality of splines 502 or slots 506 at the surface thereof. The splines or slots are adapted to engage corresponding splines at the inner surface of end 314 of handle 313. At the upper end of the splined cylinder 510 is an aperture 501 which is adapted to receive screw 311 in handle 300. In addition, an O-ring 505 is placed in a suitable groove in the end surface of cylindrical projection 510 to surround screw 311 to thereby form a watertight seal between handle 313 and ball 500.

An end cap 400 is provided at the side of the ball valve 300. The end cap 400 includes a body 402 which is formed in the same generally rectilinear configuration as the body bolt 202 and the body 301 of valve 300. At the center of the body 402 is a closed end surface 401. In the embodiment shown, the surface (or blank) is indented from the outer surface of body 402. However, this is not absolutely essential or limitative.

In the corners of body 402 are apertures 406 which are aligned with the apertures 206 in body nut 202 and the apertures 306 in valve body 301. The screws 700 pass through the apertures 406 and 306 and are threadedly attached to body nut 202 thereby to hold the apparatus together.

In addition, before the apparatus is assembled, a flanged washer 350 (or similar seal) is inserted into one side of the aperture 304 in body 301 and abuts against the surface of ball 500. An O-ring 351 is mounted on the surface of washer 350. When the valve is assembled, the ball 500 rests in rotatable abutment with the washer 350 and O-ring 351 is compressed between washer 350 and the surface of body bolt 202 in order to provide a watertight seal.

At the other side of the ball valve, a flanged washer 375 and an O-ring 376 are mounted in similar fashion thereby to provide a mounting for ball 500 and a watertight seal between washer 375 and the inner surface of end cap 400.

A plug 600 is also provided as an optional device. The plug includes a generally cylindrical body 602. The body 602 has an external diameter which is virtually the same as the inner diameter of the aperture 103 in through-hull connector 100. An eye 601 extends from the upper surface of the body for ease of manipulation. In addition, an O-ring 603 is mounted to the surface of the body 602 in an appropriate groove. A tether can be tied to eye 601 to enable retention and/or recovery of the plug when it is in use, as described infra. Alternatively, an upstanding ridge can be formed integrally with the body 602.

The plug 600 can be inserted into and stored in the hollow bore 323 at the upper end of the cylindrical portion 309 of the handle 313. The plug 600 can be selectively removed from the handle 313 to provide a closure in utilization of the plumbing system. For example, the plug 600 can be inserted into the outer end of the opening 103 in connector tube 100. The O-ring 603 (or internal ridge) operates to provide a temporary seal, if needed. Thus, the interior portions of the plumbing system can be removed from mounting nut 200 without creating a leak through the connector tube 100. Similarly, the plug 600 may be used in the event of internal plumbing failure.

Referring now to FIG. 2, there is shown a cross-sectional view of the apparatus shown in FIG. 1 after assembly thereof. In particular, the through-hull connector tube 100 includes the body 101 with external threads and a central, axial bore 103 which passes completely therethrough. The cap 102, in this instance, is a rounded or "mushroom-shaped" cap with an inner shoulder 105 which abuts against the outer surface of the hull 10 (shown in dashed outline) of the vessel in which the device is used.

A pair of indentations 104 are shown in the cap 102 on opposite sides of the bore 103. The indentations 104 are used to permit the connector 100 to be turned by any suitable tool. While a pair of indentations or slots 104 are shown, any appropriate number can be provided and used in accordance with any standard tool which is used or desired.

The mounting nut 200 is shown threadedly attached to the inner end of connector tube 100. The nut 200 includes the base 201 which is relatively large in diameter and provides a firm, secure mounting surface 291 with a relatively large portion of the inner surface of the hull 10 of the vessel.

The base 201 can be a relatively solid annulus. Conversely, the base 201 can be generally cup-shaped, i.e. hollow, with a pair of concentric rings 280 and 281 joined together by a single side wall 283. A plurality of ribs 284 extend from a central hub formed by the inner concentric ring 281 to the outer ring 280. Typically, the ribs are joined to the side (or back) wall 283. Thus, the body 201 is somewhat flexible so as to conform to the hull 10 of the vessel. However, the body 201 retains sufficient strength and rigidity to support the plumbing system and to retain the through-hull connector tube 100 in place.

Integrally formed with the main body 201 of mounting nut 200 is the body nut 202. The body 201 and body nut 202 include a central aperture 204, at least a portion of which is internally threaded to engage the threads on the connector tube 100.

The body nut 202 includes an outlet opening 203 which is slightly smaller in diameter than the diameter of the connector tube 100 and the threaded aperture 204. The opening 203 is, generally, commensurate in size with the aperture 103 through the connector tube 100.

The threaded apertures 206 in body nut 202 (see FIG. 1) are not shown in the cross-sectional view of FIG. 2. However, these apertures are provided to engage the screws 700 which hold the apparatus together.

The valve body 301 is shown in abutment against the outer surface of body nut 202. The body 301 and the nut 202 are held together by the screws 700 as suggested in FIG. 1.

The ball 500 is mounted within the cavity 304 of the valve body 301. The positioning flanges 350 and 375 are mounted inside the valve body 301 and arranged to retain the O-rings 351 and 376, respectively, in a watertight seal against the components attached to the valve body 301. The ball 500 is connected to the valve handle 313 by means of the screw 311 which, in this instance, may be a self-tapping machine screw or the like. The O-ring 505 is mounted in a groove in the upper cylindrical projection 510 portion of ball 500 to provide a watertight seal between the handle 313 and the ball. The stop mechanism 308 is shown adjacent to the cylindrical portion 309 of handle 313. The O-ring 312 is mounted between the handle 313 and the body 301 to provide a watertight seal therebetween.

At the bottom of body 301 is provided an inlet/outlet connector 302 which is shown as a barbed nozzle. The barbs are used to retain hoses attached to the connector 302. Of course, clamps can be used, as well, if desired. The ball 500, in this instance, includes a horizontal opening 503 and a vertical opening 504 wherein the opening in the connector nozzle 302 is able to selectively communicate with the opening 103 in connector tube 100. Obviously, when the handle 313 is rotated 90°, the aperture 503 is not in communication with the aperture 103, wherein the flow through the ball valve is terminated.

In this embodiment, an end cap 400 which includes the outer, peripheral portion 402 and the central cap 401, is attached to the apparatus. Thus, the flow through this plumbing apparatus is limited to flow through aperture 103 in connector 100 and the aperture in the connector nozzle 302 when the ball valve is opened. When the ball valve is closed, no fluid flow occurs.

As will become evident from further description, different arrangements of connector nozzles and/or different configurations of the aperture through the ball 500 of the ball valve can be utilized to provide different flow and/or flow direction.

Also shown in FIG. 2 is the plug 600 which is inserted into the cavity 323 in the cylindrical portion 309 of the handle 313. The plug 601 is merely stored in this cavity until needed in other applications. The plug 600 can be removed from handle 313 and placed in the aperture 103 in connector tube 100. For example, a plug 600A is shown in phantom outline in FIG. 2. Thus, plug 600A selectively prevents fluid flow through connector device 100. By placing plug 600A in the handle 313 of the valve, the plug is readily accessible when needed.

Figure 3:
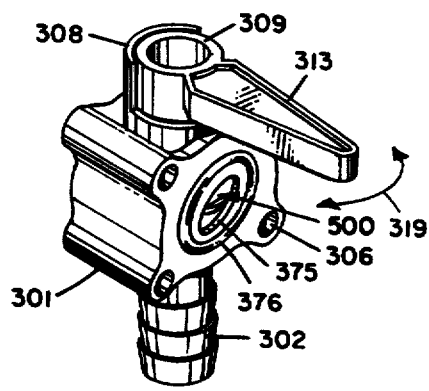
FIG. 3 is an isometric view of a fully assembled ball valve.

As is readily observed in FIG. 2, the mounting nut 200 secures the connector 100 and the internal plumbing system to the vessel. Moreover, the large diameter of the mounting nut 200 spreads out over the inner surface of the hull 10, bulkhead or the like. That is, the axial dimension 291 of the mounting nut 200 abuts the hull 10. This arrangement has the effect of spreading out any sidewise forces exerted on the plumbing system. Moreover, by providing a short, lengthwise coupling (as measured from the inner surface of hull 10), the extent of the plumbing system within the vessel is reduced. Thus, the effect of sidewise forces on the internal plumbing system is reduced. These structural arrangements have the effect of reducing leveraged forces on the connector tube 100. That is, because the plumbing elements are closer to the hull or bulkhead, the sidewise force at the extremity thereof is smaller than on a conventional system. This reduction in force has the effect of making the plumbing system more readily conform to or comply with various requirements such as but not limited to Coast Guard regulations for plumbing systems. Referring now to FIG. 3, there is shown an isometric view of the ball valve apparatus, per se. In this case, the ball valve 300 is substantially similar to the apparatus shown in FIGS. 1 and 2. Thus, an output connector nozzle 302 (with hose barb) extends from the bottom of the valve body 301. The mounting or assembly apertures 306 are provided in the body 301. The valve handle 313 is joined to a cylinder 309. In this instance, the cylinder 309 may be hollow (to receive the plug 600). Alternatively, the cylinder 309 may be solid wherein the screw 311 (see FIGS. 1 and 2) passes through cylinder 309. The handle 313 can be rotated about the central axis of the cylinder 309, as indicated by the arrow 319 adjacent thereto. The ball 500 is shown mounted within the cavity of body 301. The O-ring 376 and the retainer flange 375 are also shown in the positions taken when the apparatus is fully assembled.

Figure 4:
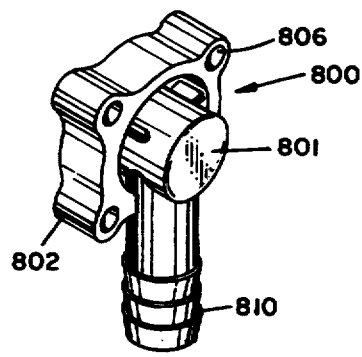
FIG. 4 is an isometric view of an end cap with an outlet elbow.

Referring now to FIG. 4, there is shown another end cap which can be assembled to the valve body 301. The end cap 800 is shaped similar to the body bolt 202 and the end cap 400. The end cap 800 includes the holes 806 for receiving the mounting screws 700, as noted above. However, the end cap 800 includes an extended cylindrical cavity 801 which protrudes from the outer surface of the body 802. The cavity 801 is aligned with and communicates with the cavity 304 in the ball valve body 301.

Depending from cavity 801 is a barbed connector nozzle 810, which is similar to the connector nozzle 302 which extends from body 301 of the valve, as shown in FIGS. 1, 2 and 3. The nozzle 810 is essentially a hollow tube with a central aperture therethrough, as shown in the nozzle 302 in FIG. 2. Typically, end cap 800 is used in lieu of end cap 400 with a ball valve 300. In this arrangement, the ball valve would (generally) not include an outlet barb 302 and the flow path is through valve 300 and out of the connector nozzle 801.

Figure 5:
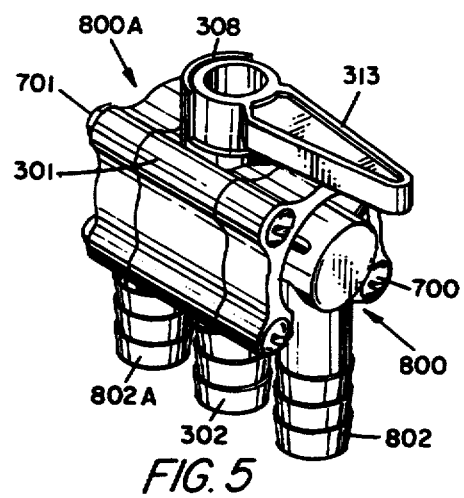
FIG. 5 is an isometric view of a diverter valve fabricated of the ball valve and elbow end cap components of the instant invention.

Referring now to FIG. 5, there is shown a control valve plumbing apparatus which incorporates a pair of angled end caps similar to the angled end cap 800 shown in FIG. 4. These end caps, referred to as end caps 800 and 800A, respectively, are mounted to the opposite surfaces of the valve body 301 by means of screws 700 and nuts 701. The valve body 301, together with handle 313 and the stop 308, operate in the same fashion as that shown and described above.

The connector nozzles 302, 802 and 802A all depend from the bottom portions of the respective components. Thus, connector nozzles 802 and 802A can be connected to different sources (or drains) while the connector nozzle 302 is connected to a common unit in the application of the device. For example, nozzle 302 can be connected via a hose (not shown) to an engine which drives the vessel. Nozzles 802 and 802A, respectively, can be connected via suitable hoses (not shown) to separate sources of fuel wherein either of the fuel sources can be used to supply fuel to the engine (via nozzle 302) by the manipulation of handle 313, which controls the operation of the ball valve included in ball valve body 301.

Of course, the apparatus can be used for discharging fluids out of connector nozzles 802 and 802A to respective containers in the opposite direction and from a common source at connector nozzle 302, if so desired.

Figure 6:
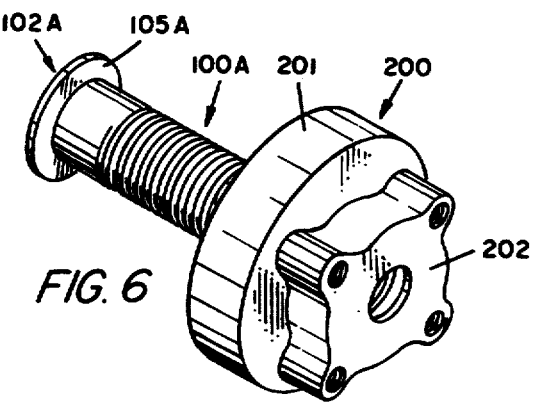
FIG. 6 is an isometric view of a preferred embodiment of the mounting nut with an alternative embodiment of the through-hull connector.

Referring now to FIG. 6, there is shown a modified embodiment of the mounting apparatus shown in FIGS. 1 and 2. In this instance, the mounting nut 200, with the large body 201 and the body bolt 202, are substantially similar to those previously shown. In this case, however, the connector tube 100A is characterized by having a head 102A, which includes a tapered undersurface 105A. This arrangement permits the head 102A of connector tube 100A to be mounted flush with the external surface of the vessel by countersinking the aperture through the hull 10 (see FIG. 2). The connector tube 100A operates in the same fashion as the connector tube 100 shown in FIGS. 1 and 2 above.

Figure 7:
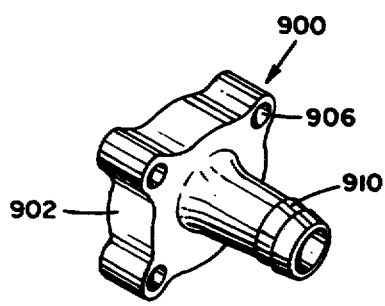
FIG. 7 is an isometric view of a straight-through end connector with a hose barb coupler.

Referring now to FIG. 7, there is shown an end cap 900, which is substantially similar to the other end caps in terms of configuration. In other words, the body 902 is of the same configuration as the other caps. The apertures 906 pass through portions thereof for assembly in the same fashion noted above. However, in the end cap 900, the hollow output connector nozzle 910 is formed at the center thereof and extends axially away from the body 902. Thus, when mounted to any of the ball valve devices shown and described above, a straight-through valve assembly can be achieved.

Referring now to FIG. 8, there is shown an apparatus assembly which includes the modifications shown and described above. In this case, the mounting nut 200 with the main body 201 and the body nut 202, are shown. A threaded connector 100A with a champfered or tapered cap 102A is engaged with the mounting nut 200. In this case, a valve body 301A, formed without the connector nozzle, is attached to the body nut 202 by screws 700. An end cap 900 (see FIG. 7) with a centrally located output nozzle 910 is attached to the body 301A of the ball valve apparatus. The outlet cap 900 provides the straight-through configuration suggested above.

In this embodiment, the handle 303 of the valve apparatus is attached to the cylinder 309 as before. However, in this embodiment, the limit stop 308A is modified to provide for a 90° operation of the handle 313 between an open and closed position. The plug 600 is shown in this embodiment but can be omitted, if so desired.

As noted above, each of the components (with the exception of the assembly screws, O-rings and the like) are formed of a suitable plastic material such as the preferred MARELON plastic. These devices can be mounted in relatively small spaces in marine vessels. They are extremely strong, corrosion-resistant, watertight, fire-resistant and have all the attributes and desirable characteristics noted above.

Thus, there is shown and described a unique design and concept of a plumbing system for use in marine vessels. The particular configuration shown and described herein relates to a plumbing system which incorporates ball, valves and similar components. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

We claim:

1. A close coupled plumbing system comprising, an elongated, hollow tube (100) having a first radial dimension and adapted to pass through an opening in a structure, said tube having first and second ends, said tube being threaded on at least a portion of the external surface thereof including said first end, said second end (102) of said tube having a second radial dimension which is larger than said first radial dimension whereby said second end is prevented from passing through said opening in the structure as said second end abuttingly engages one side of said structure, a mounting device (200), said mounting device having a third radial dimension which is substantially larger than said first and second radial dimensions whereby said mounting device is prevented from passing through said opening in the structure as said mounting device abuttingly engages another side of said structure, said mounting device adapted to be threadedly connected to said first end of said tube with a first surface thereof facing said second end of said tube whereby said mounting device can be threadedly moved toward said second end to engage the structure between said first surface of said mounting device and said second end of said tube, and a connector element (202) joined to and extending outwardly from a second surface of said mounting device for selective connection to external components of said plumbing system.

2. The system recited in claim 1 wherein, said tube and said mounting device are fabricated of a plastic type material.

3. The system recited in claim 1 including, ball valve means connected to said mounting device via said connector element in communication with said tube.

4. The system recited in claim 3 including, connector nozzle means which communicate with said tube via said ball valve means.

5. The system recited in claim 4 wherein, said connector nozzle means is integrally formed with said ball valve means.

6. The system recited in claim 3 wherein, said ball valve means includes a handle for selectively operating said ball valve means.

7. The system recited in claim 6 including, plug means adapted to be insertable into said tube to selectively block the opening therethrough, and said handle includes a storage space therein for retaining said plug means when it is not inserted into said tube.

8. The system recited in claim 1 wherein, said mounting device and said connector element are formed integrally.

9. The system recited in claim 1 wherein, said connector element has a radial dimension which is smaller than said second radial dimension.

10. A close coupled plumbing system comprising, an elongated, hollow tube having a first radial dimension, a mounting device adapted to be connected to one end of said tube, said mounting device having a second radial dimension which is substantially larger than said first radial dimension of said tube, a connector element joined to said mounting device for connection to said plumbing system, ball valve means connected to said mounting device in communication with said tube, said ball valve means including a handle for selectively operating said ball valve means, and plug means adapted to be insertable into said tube to selectively block the opening therethrough, said handle includes a storage space therein for retaining said plug means when it is not inserted into said tube.

11. The system recited in claim 10 wherein, said tube and said storage space have openings therein which are of the same diameter.

12. The system recited in claim 11 wherein, said plug means has substantially the same diameter as said openings in said tube and said storage means.

* * * * *